United States Patent
Argyriou et al.

(10) Patent No.: US 9,497,780 B2
(45) Date of Patent: Nov. 15, 2016

(54) PROTOCOL FOR SYNCHRONISING DATA PACKETS COLLISIONS IN A WIRELESS NETWORK

(75) Inventors: Antonios Argyriou, Eindhoven (NL); Ashish Vijay Pandharipande, Aachen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 403 days.

(21) Appl. No.: 13/379,454

(22) PCT Filed: Jun. 17, 2010

(86) PCT No.: PCT/IB2010/052721
§ 371 (c)(1),
(2), (4) Date: Dec. 20, 2011

(87) PCT Pub. No.: WO2010/150143
PCT Pub. Date: Dec. 29, 2010

(65) Prior Publication Data
US 2012/0106436 A1    May 3, 2012

(30) Foreign Application Priority Data
Jun. 26, 2009   (EP) ..................................... 09163949

(51) Int. Cl.
H04W 56/00      (2009.01)
H04W 88/04      (2009.01)
H04W 74/08      (2009.01)

(52) U.S. Cl.
CPC ......... *H04W 74/0816* (2013.01); *H04W 88/04* (2013.01)

(58) Field of Classification Search
USPC ....... 370/214, 230, 235, 276, 310, 312, 315, 370/328–330, 338, 351, 390, 503–520; 709/226; 455/7; 375/211
See application file for complete search history.

(56) References Cited

U.S. PATENT DOCUMENTS

2007/0015462 A1*  1/2007  Dean et al. ..................... 455/15
2007/0041398 A1*  2/2007  Benveniste .................. 370/448
(Continued)

FOREIGN PATENT DOCUMENTS

WO    WO 2006071187 A2 *  7/2006

OTHER PUBLICATIONS

Katti et al., "Embracing Wireless Interference: Analog Network Coding," in SIGCOMM'07, Aug. 27-31, 2007, Kyoto, Japan, whole document.*

(Continued)

*Primary Examiner* — Hanh N Nguyen
*Assistant Examiner* — Jose L Perez
(74) *Attorney, Agent, or Firm* — Larry Liberchuk (57) ABSTRACT

A method of synchronizing transmission of signals between two nodes in a network that includes at least another cooperating node. After reception of a clear-to-code signal (CTC) from the one node (B), broadcasting a clear-to-send signal (CTS), which contains at least a timing indication, from the cooperating node (C) to the first node (A) and the second node (B). After reception of the clear-to-send signal (CTS) by the first and second nodes (A,B), a first signal (S1) and a second signal (S2) are transmitted, via the cooperating node (C), respectively from the first node (A) to the second node (B) and from the second node (B) to the first node (A) during at least a common time period depending on the timing indication.

15 Claims, 4 Drawing Sheets

(56) References Cited

U.S. PATENT DOCUMENTS

| | | | |
|---|---|---|---|
| 2008/0247407 A1 | 10/2008 | Westphal | |
| 2008/0285480 A1* | 11/2008 | Panwar et al. | 370/253 |
| 2008/0291834 A1* | 11/2008 | Chou et al. | 370/238 |
| 2009/0268790 A1* | 10/2009 | Josiam et al. | 375/211 |
| 2009/0325479 A1* | 12/2009 | Chakrabarti | H04B 7/0417 455/7 |
| 2010/0278123 A1* | 11/2010 | Fong et al. | 370/329 |

OTHER PUBLICATIONS

S. Katti et al., "Embracing Wireless Interference: Analog Network Coding," in SIGCOMM'07, Aug. 27-31, 2007, Kyoto, Japan.

Surendra Boppana et al., "Overlapped Carier-Sense Multiple Access (OCSMA) in Wireless Ad Hoc Networks," in IEEE MILCOM, Military Comm. Conf., Oct. 2007, Orlando FL.

Prasanna Chaporkar et al., "Adaptive Network Coding and Scheduling for Maximizing Throughput in Wireless Networks", MobiCom'07, Sep. 9-14, 2007, Montreal, Quebec, Canada.

Haitao Zhao et al., "A rate-adaptive cooperative MAC protocol based on RTS/CTS scheme for MANETS", Second International Conference on Access Networks & Workshops, 2007, AccessNets '07.

Jingyao Zhang et al., "Network-Coding-Based Signal Recovery for Efficient Scheduling in Wireless Networks", IEEE Transactions on Vehicular Technology, vol. 58, No. 3, March 2009.

\* cited by examiner

PROTOCOL FOR SYNCHRONISING DATA PACKETS COLLISIONS IN A WIRELESS NETWORK

TECHNICAL FIELD

The present invention relates to the field of data packets transmission, more particularly to the field of data packets transmission in wireless distributed networks.

BACKGROUND OF THE INVENTION

The traditional view in transmission networks is to consider interference or collisions to be harmful. This is especially true with wireless networks where the spectral bandwidth available is limited. Wireless networks have thus been designed to prevent transmissions from interfering among each other.

Classical techniques to avoid interference include the reservation of the wireless channel using e.g. frequency division multiple access (FDMA), time division multiple access (TDMA), carrier sense multiple access (CSMA) or its variants. A more advanced approach to improving spectrum utilization has been by secondary usage of licensed spectrum where unlicensed devices listen on the channel and transmit only when found idle from licensed devices. Even in such an advanced "cognitive radio" approach, the idea is that unlicensed secondary devices avoid causing harmful interference to licensed devices.

In cases where interference does occur or cannot be avoided, multi-user detection (MUD) techniques have been used at the receiver side to disentangle interfered signals originating from separate transmitters. The MUD approach in general, however, requires more complex hardware at the receiver.

Recently, there has been a trend to exploit interference in order to improve the efficiency by which radio spectrum is utilized, thereby increasing the network capacity. For instance, the concepts of analog network coding (ANC) and physical layer network coding (PLNC) were introduced. Network capacity is improved using either ANC or PLNC by allowing interfering concurrent transmissions to occur.

With these techniques, certain nodes listen to transmissions and then forward the analog signals to destination nodes where interference cancellation is applied to retrieve the signal of interest. However, such techniques present several limitations To illustrate these limitations, reference is now made to FIG. 1, which shows an example of a typical network comprising seven nodes A to G.

Figure 1:
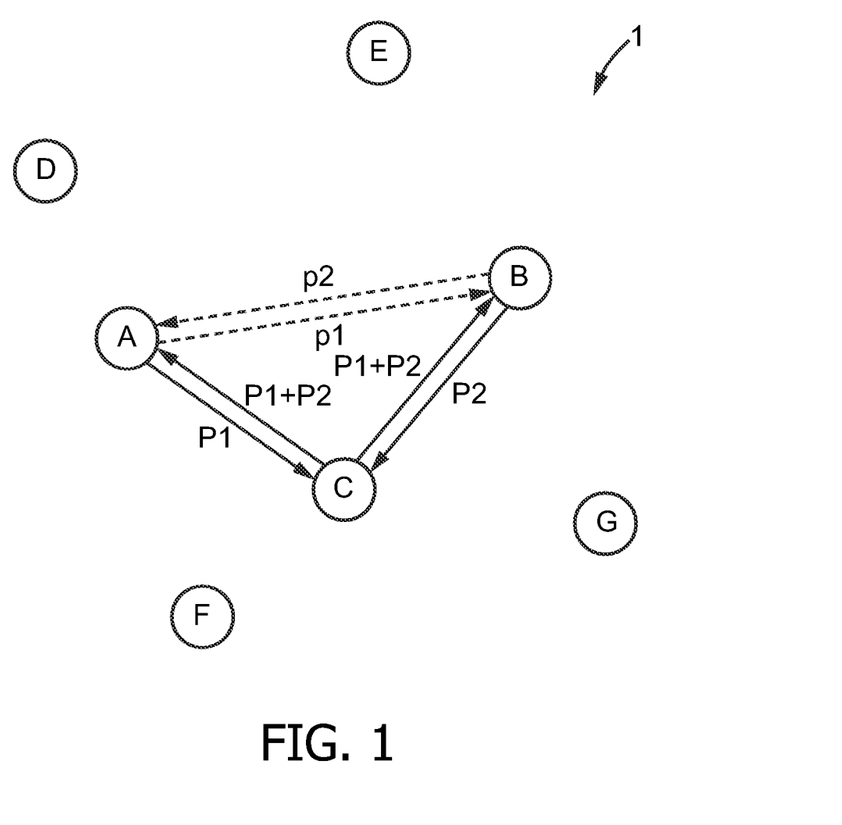
FIG. 1, already discussed, shows a graph illustrating a typical network comprising a plurality of nodes; and block diagram of a communication device.

In FIG. 1, when nodes A and B desire to send respective data packets p1,p2 to each other, they usually do so directly and sequentially (as indicated with dotted lines), after that the nodes have captured the channel through CSMA for instance, or once transmission slots have been allocated through TDM in another example.

If the network uses existing ANC or PLNC schemes, nodes are allowed to transmit concurrently when an intermediate router node (in the present example, node C) exists between them. For that purpose, both nodes A and B transmit respective analog signals P1 and P2, which contain respectively data packets p1 and p2, to the intermediate router node C, which in turn returns the resulting combined analog signal P1+P2, comprising therefore both packets p1 and p2, to both nodes A and B. Each of these nodes A and B, receiving such a combined analog signal P1+P2 and knowing the signal it has sent itself (P1 for node A, P2 for node B), can deduct the analog signal it should receive (P2 for node A, P1 for node B), by removing the signal it has sent itself from the received combined signal. This scheme results in the use of fewer channels, thus leading to an increase in throughput.

However, in existing networks such as wireless local area networks (WLANs), there are no mechanisms that permit the use of ANC or PLNC schemes. The transmitting nodes have to synchronize their transmissions to ensure that packets collide so that decoding is later possible.

In particular, to realize the potential gains offered by ANC or PLNC schemes, two major issues arise. First, it is necessary to define how the nodes determine which transmissions are mixed in order to decode them. Secondly, it is necessary to determine the start and end times of transmissions that are allowed to be mixed.

To cope with the first above-mentioned issue for instance, a complex solution is proposed in the article "Embracing Wireless Interference: Analog Network Coding", Katti et al., for the special case of MSK (Minimum frequency Shift Keying) modulated signals. Such a complex solution consists in measuring the variance of the received energy, and use the deviation from the constant signal energy property that holds for MSK in order to estimate the time instant which two packets collided. This method holds only for MSK signals. Further, additional hardware is required for the variance estimator. In addition, this process has to be executed throughout the reception phase of a packet since the receiver does not know the exact moment that collision will occur.

The mechanism used by the authors in Katti et al. to cope with the second issue consists in introducing known pilot bit sequences at the beginning and end of each packet (i.e. in preambles and postambles respectively). This is needed so that they identify the start and end of a packet that is needed for analog decoding. The disadvantage of this approach is that every frame at the physical layer must be extended with both a preamble and a postamble, even when no opportunities for using an ANC or PLNC scheme arise. Another disadvantage is that the preambles and postambles have to be received without interference, so that the receiving node can correctly identify the start of the packet. By randomizing transmissions as done in Katti et al., it is possible that this condition is not always satisfied.

It is thus an object of the present invention to overcome the above-identified difficulties and disadvantages by proposing a protocol which allows synchronisation of the transmission of colliding packets. Such a protocol overcomes several of the limitations of ANC or PLNC schemes that arise in practice in distributed wireless networks.

SUMMARY OF THE INVENTION

According to a first aspect of the invention, there is provided a method of synchronising transmission of data signals as recited in claim 1.

Thus, the present invention provides a method for synchronising transmission of data signals which is not limited to a specific kind of modulation, such as MSK, and which does not necessitate the systematic extension of data packets with known bit sequences in the physical layer.

According to a second aspect of the invention, there is provided a cooperating node for synchronising transmission of data signals as recited in claim 11.

According to a third aspect of the invention, there is provided a network for implementing the method according to the first aspect of the invention, as recited in claim 13.

According to a fourth aspect of the invention, there is provided a computer program product comprising instructions for implementing the method according to the first aspect of the invention when loaded and run on computer means of a network node.

Other aspects of the invention are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Next some embodiments of the present invention are described in more detail with reference to the attached figures.

Figure 2:
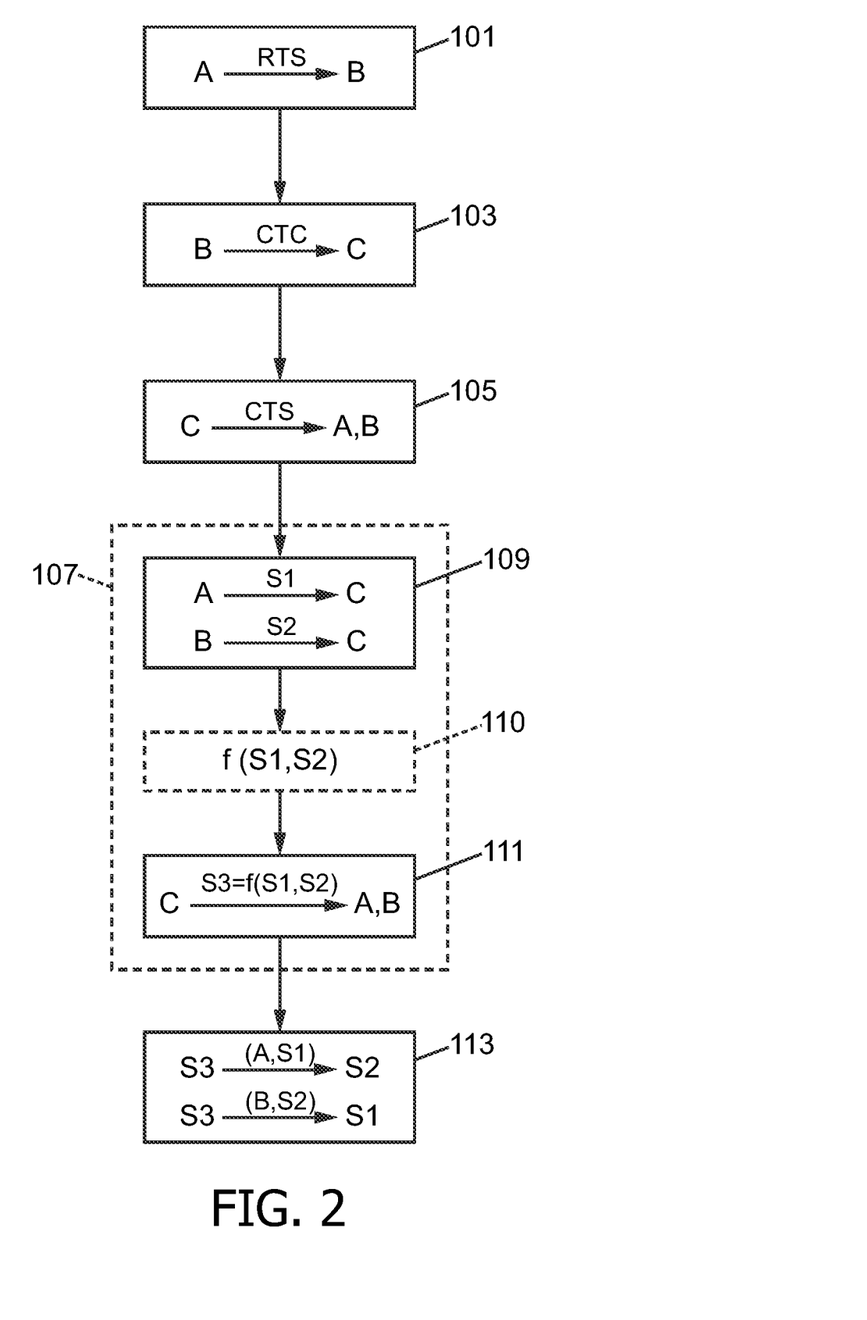
FIG. 2 is a flow chart illustrating a method for simultaneously transmitting signals in accordance with the present invention.

FIG. 2 shows a flow chart illustrating a method for simultaneously transmitting data signals in accordance with the present invention, when applied to a network similar to the one depicted in FIG. 1.

In step 101, node A indicates its desire to send at least one data packet p1 to another node, for instance node B in FIG. 1. In order to do so, Node A generates and transmits a first signal, called a "Request-to-Send" signal (further referred to as a RTS signal) which indicates that Node A is ready and willing to send a data packet p1 to node B.

Such a RTS signal may contain an indication of the intended destination of the data packet p1 (node B here), as well as the transmission duration of the data signal S1 containing data packet p1 intended to be transmitted. This RTS signal is send at least to the destination node B in order to inform node B that node A intends to send it a data packet.

After having received this RTS signal where it is designated as a destination node, node B generates and transmits a second signal, called a "Clear-to-Code" signal (further referred to as a CTC signal) in step 103, which indicates the concurrent desire of node B to transmit also at least one data packet p2 to node A.

Such a CTC signal may contain an indication of the intended destination of the data packet p2 (node A here), as well as the transmission duration of the data signal S2 containing data packet p2 intended to be transmitted. Such a CTC signal is transmitted at least to a third node, called "cooperating node", for instance node C in FIG. 1, which interprets such a CTC signal as an indication that node B and another node want to transmit concurrently data signals and that they look for a cooperating node for that purpose.

In a first embodiment, the RTS signal sent to node B is also sent to the cooperating node C, which is then informed that nodes A and B want to exchange data signals with the reception of both RTS and CTC signals and can organise the synchronisation of their concurrent transmission.

In another embodiment, the RTS signal is only sent to the destination node B, and not to the cooperating node C. In such a case, when generating the CTC signal, node B incorporates an indication that node A wants to transmit a data packet to node B. In that way, when receiving the CTC signal, the cooperating node C is aware that both nodes A and B want to exchange concurrently data packets.

In a further embodiment, the CTC signal sent to cooperating node C is also broadcasted to node A as well. Such an embodiment is advantageous in that, once the CTC signal is received by node A, node A knows that its RTS signal has been correctly received by node B. Therefore, the CTC signal equates to an acknowledgement of reception of the RTS signal by node B. This is particularly useful if the network 1 uses a protocol forcing node A to retransmit the RTS signal as long as there is no acknowledgement received.

Once the CTC signal has been received by cooperating node C, this cooperating node C knows that both nodes A and B want to send some data signals to each other during a concurrent time duration and ask for its assistance to implement such a concurrent transmission, for instance by implementing the aforementioned ANC or PLNC schemes. In that case, the CTC signal indicates imminent transmission using such an ANC or PLNC scheme and also identifies that the transmissions from node A and B which will be mixed.

In order to do so, cooperating node C generates and transmits, in step 105, a "Clear-to-send" signal (further called CTS signal) to node A and node B, which informs these nodes that concurrent transmission of the data signals can occur during at least a common time period, for instance in a definite time frame. Such information is implemented by inserting a timing indication in the CTC signal which will allow both nodes A and B to derive, from this timing indication, when to start transmitting the respective data signals S1 and S2 so that they overlap in time during at least a common time period. In that sense, the common time period depends on the timing indication inserted in the CTS signal.

Such a timing indication can consist, for instance, in an indication of a common starting time of transmission. With such a starting time indication, once nodes A and B have received the CTS signal, they will start transmitting their respective data signals S1 and S2 at the same common time indicated derivable from the CTS signal. Such a synchronisation ensures that the transmission of both signals S1 and S2 overlaps at least during a common time period, no matter how long are the respective durations of signals S1 and S2.

The previous example of timing indication is a non-limiting example and other types of timing indication can be used, as long as they ensure the overlap of the data signals transmission. For instance, once cooperating node C knows the respective duration of signals S1 and S2, it can calculate different starting times for node A and node B shifted in time. As long as such a shift in time is less than the duration of the first signal to be transmitted, the overlap is ensured and concurrent transmission occurs. In that case, the timing indication in the CTS signal consist in an indication of the respective transmission starting times for node A and node B.

Different starting times for nodes A and B might be inserted by cooperating node C for a variety of different reasons. For instance, if there is a difference of transmission time between the transmission from cooperating node C to node A and the transmission from cooperating node C to node B, different starting times can be inserted to compensate for this transmission time difference, in order for the reception of the signals S1 and S2 by cooperating node C to start at a substantially identical time.

Another reason for inserting different starting time is the difference of receiver processing abilities between nodes A and B. If, for instance, the receiver processing abilities are more limited at node B than at node A, cooperating node C might delay the transmission starting time of node A when compared to the one of node B, to take into account the additional relative delay induced by these limited receiver processing abilities at node B.

In the embodiment where the RTS signal is also sent to node C, cooperating node C derives the duration of the first data signal S1 from the indication given in the RTS signal and the duration of the second data signal S2 from the indication given in the received CTC signal. In the other embodiment where the RTS signal is not sent to node C, the duration of the first data signal S1 can be derived from a supplementary indication added by node B in the CTC signal. Therefore, in a further embodiment, the CTS signal generated by cooperating node C indicates the longest duration between the first and the second signals S1 and S2 which will be mixed.

Once each node A and B has received the CTS signal, the simultaneous transmission can actually be achieved during step 107, where data signal S1 is sent from node A to node B, via the cooperating node C, while data signal S2 is sent from node B to node A, via the cooperating node C, during at least a common time period.

The aforementioned common time period can be a common time frame or a time period where both transmissions of signal S1 from node A and signal S2 from node B at least overlap. In the specific case where the two data signals have the same duration, a time period for the simultaneous transmission can be defined, with a common starting point, ensuring that the simultaneous transmissions precisely overlap.

In a specific embodiment, the step 107 can be divided into two sub-steps 109 and 111.

In step 109, each one of node A and B transmits their respective data signals S1 and S2, each one comprising data packets p1 and p2, towards cooperating node C. This concurrent transmission occurs in the same time frame, or at least during a common time period. Preferably, this concurrent transmission starts at the same time. The transmissions of signals S1 and S2 are thus synchronised and the signals S1 and S2 are received by the receiver of cooperating node C.

Subsequently, in step 111, cooperating node C transmits a mixed data signal S3, based upon the received data signals S1 and S2, towards both nodes A and B. This mixed signal S3 can then be used by the respective receivers of nodes A and B for decoding the desired packets in step 113.

In an embodiment of the present invention, the data signals S1 and S2 are received mixed with each other by the receiver of cooperating node C in step 109. In that case, during subsequent step 111, the mixed signal S3 transmitted by cooperating node C can simply consist in forwarding the received mixed signal (i.e. the mixed signal S3 equates then to the addition of data signals S1 and S2), amplified if necessary, to both nodes A and B. However, such case is not limiting, and the mixed signal S3 can result from a further data processing (such as a filtering, a convolution, a correlation, a quantization, etc...), during an optional step 110, of both data signals S1 and S2.

After step 107, each one of node A and B receives the mixed signal S3 which is for instance the result from the addition of S1 and S3. In order to decode such a signal during step 113, node A (resp. node B) will remove from the mixed signal S3 the data signal S1 (resp. S2) it has sent during step 105, therefore deducting data signal S2 (resp. S1). From the deducted data signal S2 (resp. S1), it is then possible to derive the data packet p1 (resp. P2) to be received.

As already explained beforehand, with such a protocol, the receivers of nodes A and B do not need to explicitly identify which data signals are mixed since they know implicitly, after they have received a CTS signal from cooperating node C, that the signal S3 received from this cooperating node is based upon mixed signals S1 and S2. This relieves the necessity to introduce known pilot bit sequences at the beginning and at the end of each packet, which causes the unnecessary extension of every frame at the physical layer.

Moreover, such a protocol ensures that the mixed signals will be perfectly synchronised.

In the aforementioned method, the RTS signal is said to be sent to the destination node B for the packet as well as to at least one cooperating node C. In one embodiment, this cooperating node is selected before the transmission of the RTS signal, for instance based on the channel conditions or factors such as the distance between the different nodes of the network or their availability, or based on the most energy-efficient communication path.

In another embodiment, the RTS signal can be sent to a plurality of potential cooperating nodes, for instance nodes C, D, E or F in FIG. 1, or even to all the nodes of the network, for instance by using a specific broadcast channel. In that case, the selection of the node which will actually cooperate with nodes A and B may be done after reception of the RTS signal, based on the channel conditions or factors such as the distance between the different nodes of the network or their availability, or based on the most energy-efficient communication path.

The same applies to the CTC signal. This CTC signal has been previously said to be sent to at least the cooperating node C. In one embodiment, this cooperating node C has been selected before the transmission of the CTC signal, for instance based on the channel conditions or factors such as the distance between the different nodes of the network or their availability.

However, in another embodiment, this CTC signal can be sent to a plurality of potential cooperating nodes which have already received the RTS signal, or even to all the nodes of the network, for instance by using a specific broadcast channel. The selection of the node which will actually cooperate with nodes A and B may be done then after reception of the CTC signal, based on the channel conditions or factors such as the distance between the different nodes of the network or their availability.

At least one of these potential cooperating nodes should receive information about node A and node B, for instance by receiving both RTS and CTC signal or by receiving only a CTC signal containing an indication about the intention of node A to transmit a data packet to node B, to ensure the proper synchronisation of the transmission.

With the broadcast of RTS and CTC signals to a plurality of potential cooperating nodes, the best cooperating node among the potential cooperating nodes can be chosen (based on optimal channel conditions or transmission measurements) and used. Such an embodiment is advantageous in terms of reliability (in case of failure of cooperating node C, for instance) and adaptability.

Figure 3:
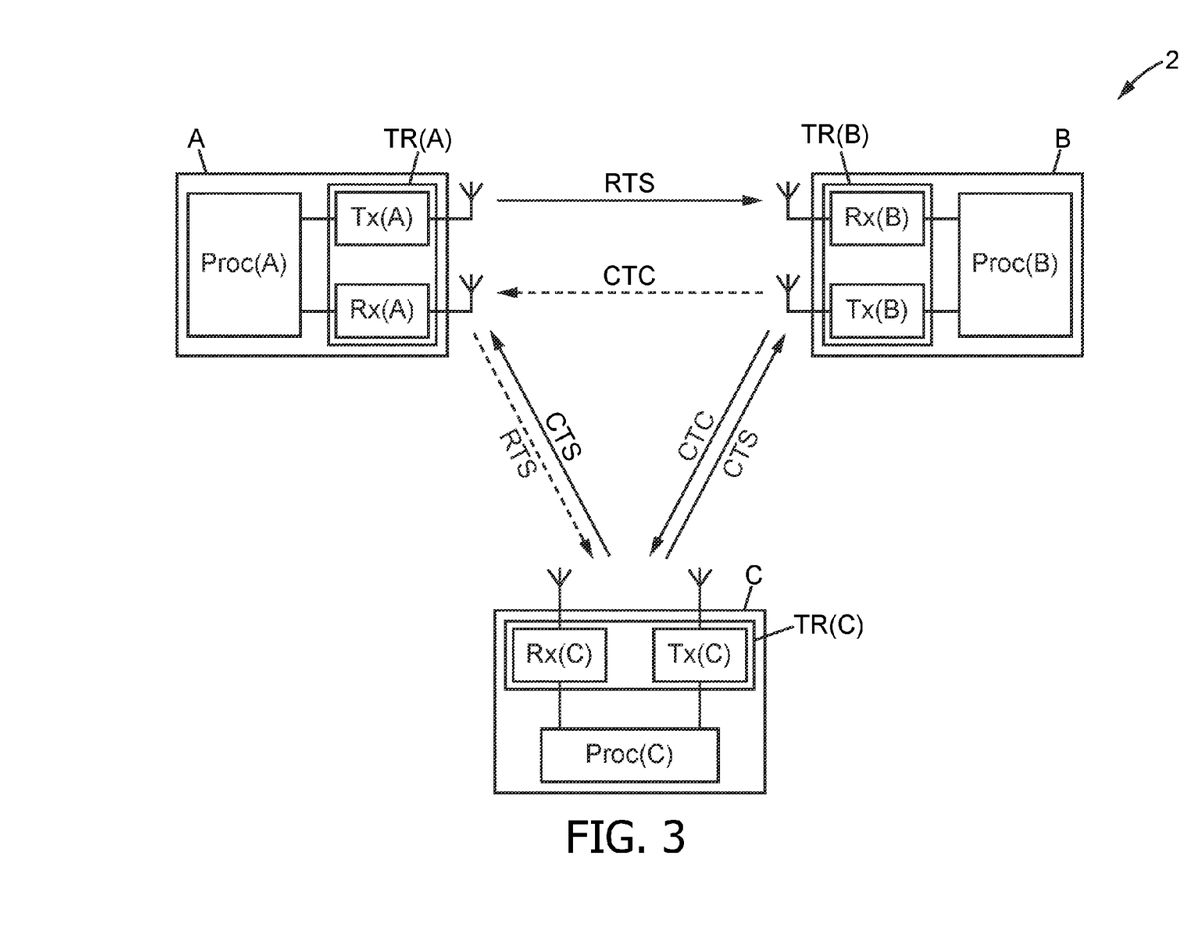
FIG. 3 shows in more details a network comprising three nodes using the method for simultaneously transmitting signals in accordance with the present invention.

FIG. 3 shows in more details a non-limiting example of network comprising three nodes A, B and C and using the method for simultaneously transmitting data signals in accordance with the present invention.

In FIG. 3, each node A, B and C comprises a transceiver module (respectively TR(A), TR(B) and TR(C) and a processing module (respectively PROC(A), PROC(B) and PROC(C)). The transceiver modules allow the nodes to communicate with other nodes by transmitting and receiving data packets, and the processing modules allow the nodes to process received signals or generate signals to be transmitted.

In the present example, each transceiver module comprises a transmitting module (respectively Tx(A), Tx(B) and Tx(C)) and a receiving module (respectively Rx(A), Rx(B) and Rx(C)). With such an advantageous configuration, the nodes can receive and transmit packets simultaneously. However, this is a non-limiting example and each node may present a transceiver module with a single antenna instead of separate transmitting and receiving modules. Such an alternative configuration requires additional management for switching between reception and transmission modes.

As it can been seen from FIG. 3 the transmitting module Tx(A) first sends a RTS signal to the receiving module Rx(B) as previously described in accordance with step 101. Optionally, the transmitting module Tx(A) also sends the RTS signal to the receiving module Rx(C) (shown in dotted line), and potentially to other receiving modules of other non-depicted potential cooperating nodes, for instance via a broadcast channel. The nodes receiving such a RTS signal are made aware that node A is willing to transmit at least a data packet p1 to node B.

After reception of the RTS signal, the transmitting module Tx(B) sends a CTC signal to the receiving module Rx(C), as previously described in accordance with step 103. Optionally, the transmitting module Tx(B) also sends the RTS signal back to the receiving module Rx(A) (shown in dotted line), and potentially to other receiving modules of other non-depicted potential cooperating nodes, for instance via a broadcast channel. The nodes receiving such a CTC signal are made aware that node B is also willing to transmit at least a data packet p2 to node A.

After reception of the CTC signal, cooperating node C knows that a simultaneous transmission can occur between nodes A and B. Its transmitting module Tx(C) then sends a CTS signal, as previously described in accordance with step 105, to both receiving modules Rx(A) and Rx(B), in order to inform them that the cooperating node C can help them in their simultaneous transmission.

Once the CTS signal has been received by the receiving modules Rx(A) and Rx(B), simultaneous transmission can occur in accordance with steps 109 and 111 as previously described, where the transmitting module Tx(A) sends a first data signal S1 comprising at least the data packet p1 to the receiving module Rx(C) while the transmitting module Tx(B) sends a second signal S2 comprising at least the data packet p2 to the receiving module Rx(C).

Figure 4:
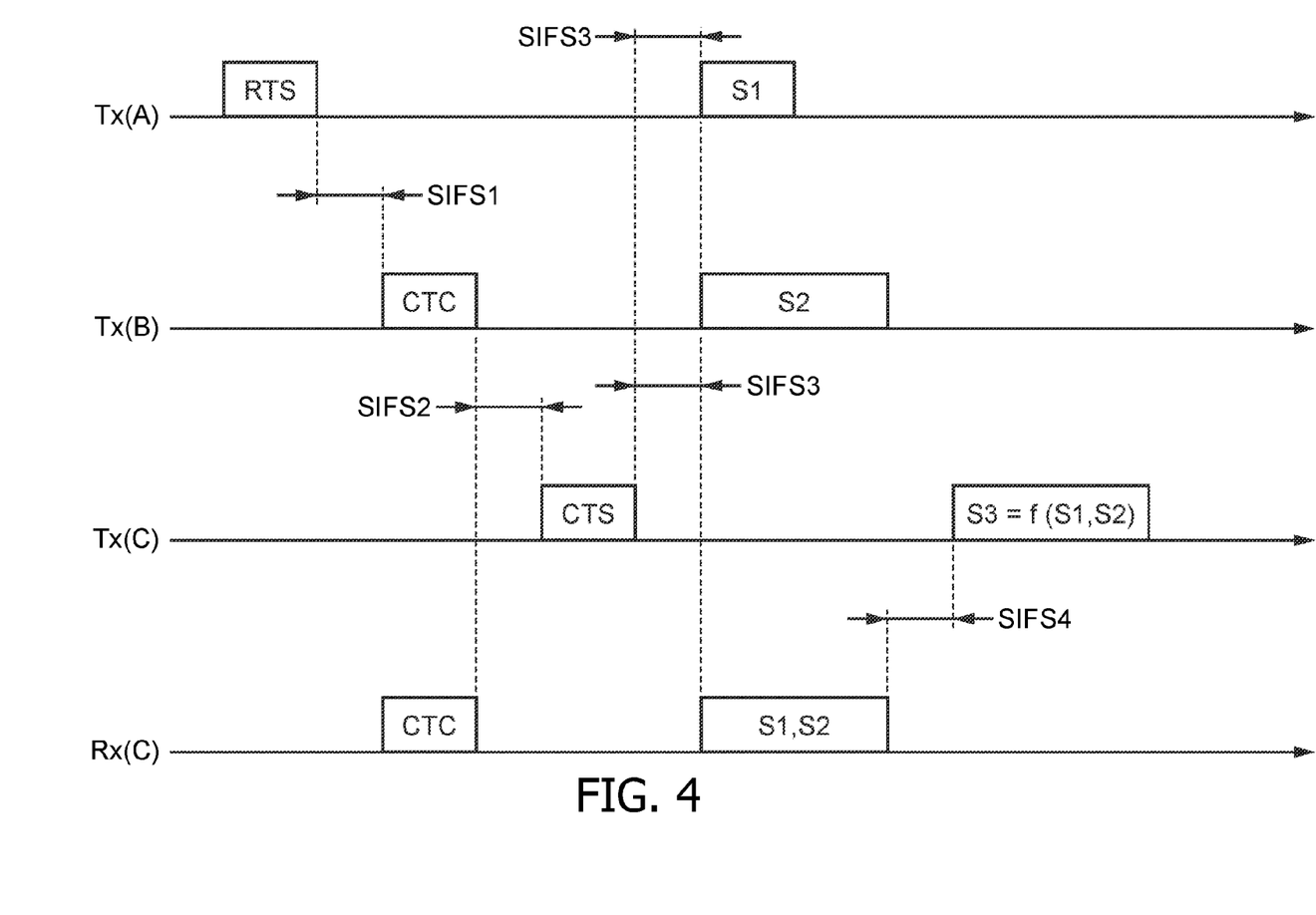
FIG. 4 is a timing diagram illustrating method for simultaneously transmitting signals in accordance with the present invention.

The transmission of signals S1 and S2 is preferably precisely synchronised, i.e. starts substantially at the same time thanks to a timing indication included in the CTS signal indicating a common starting time for instance, as shown in FIG. 4. In that case, since the duration of signal S1 is shorter than the duration of signal S2, the transmission of signal S1 entirely overlaps with the transmission of signal S2.

However, the transmission of signals S1 and S2 may also partly overlap in time without starting precisely at the same time, for instance thanks to time-shifted starting times respectively for node A and B, indicated in the CTS signal, which allows transmission overlap depending on the data signals respective durations. Even in this latter case where the overlap in time might be partial, an optimisation of the available resources still occurs.

In an embodiment, node C knows the duration of both data signals S1 and S2, since they can be indicated respectively in the RTS and CTC signals. With the knowledge of these respective durations, PROC(C) can determine the longest duration and will instruct the receiving module Rx(C) to remain in receiving mode during at least this longest duration. This is especially advantageous when node C comprises a transceiver module with a single antenna, since such a module needs to know the duration of its receiving mode.

With the configuration depicted in FIG. 3 (i.e. transceivers with separate receiving and transmitting modules), once the signals S1 and S2 have been completely received, both signals can be mixed and retransmitted directly to the nodes A and B, in accordance with step 111 as previously discussed. Each node A and B will then receive a mixed signal containing signals S1 and S2, and with the knowledge of signal they have sent (S1 for node A or S2 for node B), nodes A and B are able to deduct the signal to be received and decode the data packets p1 and p2.

With the alternative configuration where node C presents a transceiver module with a single antenna, once the signals S1 and S2 have been completely received during the receiving mode of the transceiver module, a time gap is necessary before the transceiver module can switch from its receiving mode to its transmitting mode. To that purpose, specific time periods called "Short Inter-Frame Space" as described hereafter.

However, instead of simply retransmitting a mixed signal to both nodes A and B, other types of data processing such as an amplification, a regeneration, a filtering, and so on, can be realised by the processing module PROC(C) in accordance with the previously described step 110.

FIG. 4 shows a timing diagram illustrating method for simultaneously transmitting data signals in accordance with the present invention, when applied to a network as shown in FIG. 1.

On this timing diagram, four timing lines are described in parallel. The first line, referred to as Tx(A), describes the signals transmitted by node A. The second line, referred to as Tx(B), describes the signals transmitted by node B. The third line, referred to as Tx(C), describes the signals transmitted by node C. Finally, the fourth line, referred to as Rx(C), describes the signals received by node C.

On this timing diagram, the first event to occur is the transmission, by node A, of the RTS signal indicating its desire to transmit a data packet to node B. The RTS signal is received at the destination node B, as well as optionally at cooperating node C. The second event which occurs is the transmission of the CTC signal, generated by node B in response to the reception of the RTS signal from node A, to cooperating node C, as well as optionally to node A. In an embodiment, the transmission of the CTC signal occurs preferably after a first time period called "Short Inter-Frame Space" (SIFS1 on FIG. 4). Such a SIFS1 time period allows the node B to process the received RTS signal in order to generate the CTC signal. Moreover, if node B presents a transceiver with a single antenna, such a SIFS1 time period allows switching from the receiving mode to the transmitting mode as well.

As such the CTC indicates imminent simultaneous transmissions, for instance using an ANC or a PLNC scheme, and also identifies that the transmissions from nodes A and B that will be mixed. The CTC is received at least by cooperating node C, as indicated on the fourth timing line. This cooperating node C determines that nodes A and B would like to transmit packets to each other with its assistance and that there is, for instance, an opportunity to employ an ANC or a PLNC scheme.

Cooperating node C subsequently generates and transmits the CTS signal to nodes A and B to inform these nodes that simultaneous transmission may ensue. In a specific embodiment, the transmission of this CTS signal occurs preferably after a second "Short Inter-Frame Space" time period (SIFS2 on FIG. 4), once again to give enough time to the cooperating node C to process the received CTC signal in order to generate the CTS signal. Moreover, if cooperating node C presents a transceiver with a single antenna, such a SIFS2 time period allows switching from the receiving mode to the transmitting mode as well.

Based on the received CTS signal, the transmission of signals S1 and S2 from nodes A and B can be substantially synchronized, for example by indicating in the CTS signal a precise common time at which these transmissions should start. In another specific embodiment, nodes A and B begin transmitting signals S1 and S2 after a third "Short Inter-Frame Space" time period (SIFS3 on FIG. 4), once again to give enough time to nodes A and B process the received CTS signal, as well as to allow a single antenna transceiver that node A or B might use to switch from the receiving mode to the transmitting mode.

As indicated on the fourth timing line, the mixed transmission of signals S1 and S2 is received at cooperating node C. In the present example, signal S1 is shorter than S2, thus its transmission ends before the end of the transmission of signal S2. However, in the aforementioned embodiments where the cooperating node C is informed of the duration of both signals S1 (either via the RTS signal when received directly by node C, or indirectly via the CTC signal when the RTS is not received directly by node C) and S2 (via the CTC signal), the cooperating node C can deduct the longest duration and will remain in reception mode for at least this longest duration, to ensure that the full mixed signal is received.

In the present non-limiting example, cooperating node C subsequently forwards the mixed signal S3, based here simply on the mixing of signals S1 and S2 as received. Once again, in a preferred embodiment, the transmission of this mixed signal S3 occurs preferably after a fourth "Short Inter-Frame Space" time period (SIFS4 on FIG. 4), to allow switching from the receiving mode to the transmitting mode if cooperating node C presents a transceiver with a single antenna. Moreover, if between the reception of signals S1 and S2 in accordance with step 109 and the transmission in accordance with step 111, there is some kind of processing (step 110), such a SIFS4 time period gives enough time to the cooperating node C to process the received signals in order to generate and process the mixed S3 signal.

The four "Short Inter-Frame Space" time periods SIFS1, SIFS2, SIFS3 and SIFS 4 introduced here above can be defined independently or can present the same duration. Such SIFS can as well depend on the physical layer used by the network and present therefore a minimum time duration defined in the standards used by said physical layer.

Finally, once the mixed signal S3 is received by both nodes A and B, it can be used then by the respective receivers at these nodes to decode the desired packets in a way similar to Katti et al.

The aforementioned RTS, CTC and CTS signals can take any form suitable of inter-node message able to indicate a data transmission to occur, like a form already available in the protocols used by the network, for instance a MAC message used with the IEEE standards.

While the present invention can apply to any kind of network where cooperative collisions of data packets can be implemented, for example by application of a specific coding in the physical layer, the present invention is particularly suited for distributed wireless networks such as WLAN, WPAN or WBAN, where it ensures an improved performance, for instance in terms of throughput increase.

The invention also relates to a computer program product that is able to implement any of the method steps as described above when loaded and run on computer means of a network node. The computer program may be stored/distributed on a suitable medium supplied together with or as a part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive, the invention being not restricted to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for synchronizing transmission of data signals between at least a first node and a second node in a network comprising said first and second nodes and at least one cooperating node, the method comprising:

after reception, by the at least one cooperating node, of a clear-to-code signal transmitted by the second node, broadcasting a clear-to-send signal, which contains at least a timing indication, from the at least one cooperating node to the first node and the second node, wherein the clear-to-code signal informs the at least one cooperating node that the first node and the second node want to exchange data packets concurrently during at least a common time duration, and wherein the timing indication includes a first time for starting transmission of a first data signal from the first node and a second time for starting transmission of a second data signal from the second node; and after reception of the clear-to-send signal by the first and second nodes, transmitting, via the at least one cooperating node, the first data signal from the first node to the second node and the second data signal from the second node to the first node concurrently in order to have the first data signal overlap the second data signal during the at least a common time period, wherein the at least a common time period for concurrently transmitting the first and second data signals is dependent on the timing indication.

2. The method according to claim 1, further comprising:
   transmitting a request-to-send signal from the first node to at least the second node;
   after reception of the request-to-send signal by the second node, transmitting the clear-to-code signal from the second node to at least the cooperating node.

3. The method according to claim 2, wherein the transmitting the clear-to-code signal occurs after a first predetermined time period from reception of the request-to-send signal.

4. The method according to claim 2, wherein the broadcasting the clear-to-send signal occurs after a second predetermined time period from reception of the clear-to-code signal.

5. The method according to claim 2, wherein the request-to-send signal is also transmitted to the at least one cooperating node.

6. The method according to claim 5, wherein the request-to-send signal comprises a first duration value indicating the duration of the first data signal to be sent by the first node, the clear-to-code signal comprises a second duration value indicating the duration of the second data signal to be sent by the second node and the clear-to-send signal is generated based on the longest duration value among said first and second duration values.

7. The method according to claim 1, wherein the clear-to-code signal is also transmitted to the first node.

8. The method according to claim 1, wherein the transmitting, via the at least one cooperating node, a first signal from the first node to the second node and a second signal from the second node to the first node comprises:
   transmitting the first signal from the first node to the at least one cooperating node and the second signal from the second node to the at least one cooperating node; and
   transmitting a third signal based upon at least the first and second signals from the at least one cooperating node to the first node and the second node.

9. The method according to claim 8, wherein the transmitting the first signal and the second signal occurs after a third predetermined time period from reception of the clear-to-send message.

10. The method according to claim 8, wherein the transmitting the third signal occurs after a fourth predetermined time period from the complete reception of the first and second signals.

11. A cooperating node for synchronizing transmission of signals between a first node and a second node in a data transmission network, the cooperating node comprising:
   a transceiver module configured to receive at least a clear-to-code signal from the second node and configured to transmit a clear-to-send signal to the first and the second nodes, wherein the clear-to-code signal informs the cooperating node that the first node and the second node want to exchange data packets concurrently during at least a common time duration, and
   a processing module configured to generate the clear-to-send signal containing a timing indication enabling the first and second nodes to transmit respective first and second data signals concurrently in order to have the first data signal overlap the second data signal during the at least a common time period, wherein the timing indication includes a first time for starting transmission of the first data signal from the first node and a second time for starting transmission of the second data signal from the second node, and wherein the at least a common time period for concurrently transmitting the respective first and second data signals is dependent on the timing indication.

12. The cooperating node according to claim 11, wherein the transceiver module is configured to receive a request-to-send signal from the first node and in that the processing module is configured to generate the clear-to-send signal depending on the information contained in the received request-to-send signal.

13. The cooperating node according to claim 12, wherein the first node is configured to transmit a request-to-send signal at least to the second node, the second node is configured to transmit a clear-to-code signal at least to the cooperating node and both the first and second nodes are configured to receive a clear-to-send signal containing the timing indication from the cooperating node.

14. The cooperating node according to claim 13, wherein the data transmission network is a wireless network using analog network coding or physical layer network coding.

15. A non-transitory computer-readable medium having one or more executable instructions stored thereon that, when executed by one or more processors, cause the one or more processors to perform a method for synchronizing transmission of data signals between at least a first node and a second node in a network comprising said first and second nodes and at least one cooperating node, the method comprising:
   after reception, by the at least one cooperating node, of a clear-to-code signal transmitted by the second node, broadcasting a clear-to-send signal, which contains at least a timing indication, from the at least one cooperating node to the first node and the second node, wherein the clear-to-code signal informs the at least one cooperating node that the first node and the second node want to exchange data packets concurrently during at least a common time duration, and wherein the timing indication includes a first time for starting transmission of a first data signal from the first node and a second time for starting transmission of a second data signal from the second node; and
   after reception of the clear-to-send signal by the first and second nodes, transmitting, via the at least one cooperating node, the first data signal from the first node to the second node and the second data signal from the second node to the first node concurrently in order to have the first data signal overlap the second data signal during at least a common time period, wherein the at least common time period for concurrently transmitting the first and second data signals is dependent on the timing indication.

\* \* \* \* \*